United States Patent [19]

Guillemot

[11] 4,393,713

[45] Jul. 19, 1983

[54] DIGITAL PRESSURE-MEASURING DEVICE

[75] Inventor: Philippe Guillemot, Paris, France

[73] Assignee: Mecilec, Paris, France

[21] Appl. No.: 241,743

[22] Filed: Mar. 9, 1981

Related U.S. Application Data

[63] Continuation-in-part of Ser. No. 52,980, Jun. 28, 1979, Pat. No. 4,301,685.

[30] Foreign Application Priority Data

Jan. 27, 1980 [FR] France ................................ 81 01450

[51] Int. Cl.³ .............................................. G01L 9/00
[52] U.S. Cl. ....................................... 73/701; 73/705; 73/717
[58] Field of Search ................. 73/701, 705, 716, 720, 73/721, 723, 726, 727, 753, 754, 717, DIG. 11

[56] References Cited

U.S. PATENT DOCUMENTS 3,397,581  8/1968  Bush ...................................... 73/716

Primary Examiner—Donald O. Woodiel
Attorney, Agent, or Firm—Michael J. Striker

[57] ABSTRACT

The pressure-measuring device comprises a first chamber subjected to the pressure to be measured and a second chamber connected to the first through an opening fitted with a valve. The device further comprises a valve-control circuit and an element for detecting the instants at which the pressure difference between the two chambers attains a predetermined increment or decrement or a zero value. The detection element consists of a deformable pressure-tight wall placed between the two chambers and adapted to produce action on an optoelectronic, piezoelectric or electromechanical element which converts the deformation directly to logical signals. A bidirectional counter is provided for forward or backward counting of the increments and decrements obtained.

7 Claims, 4 Drawing Figures

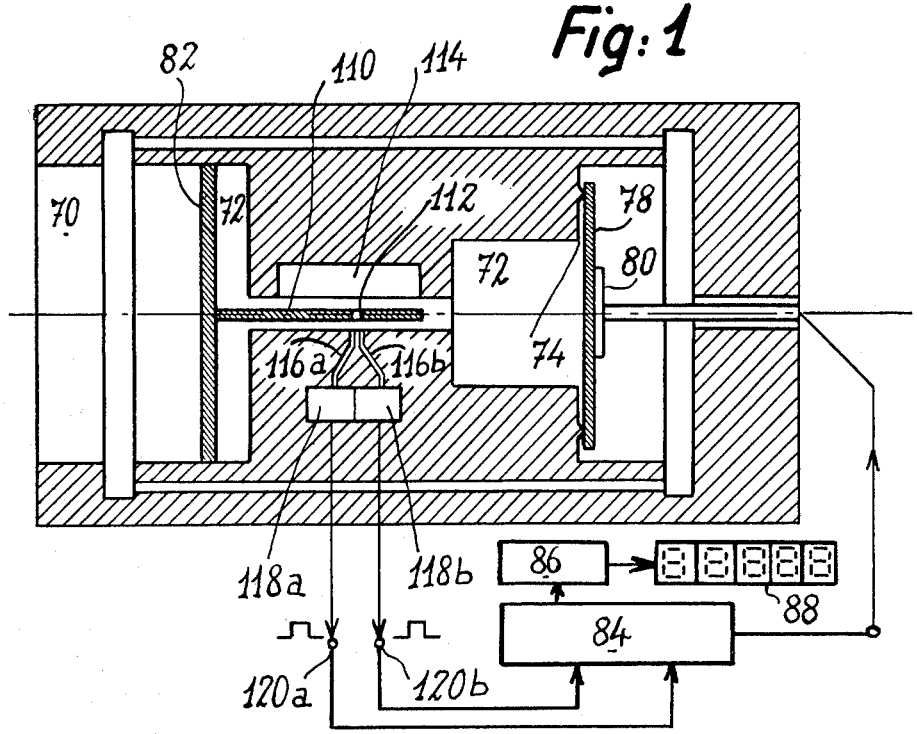
Fig:1
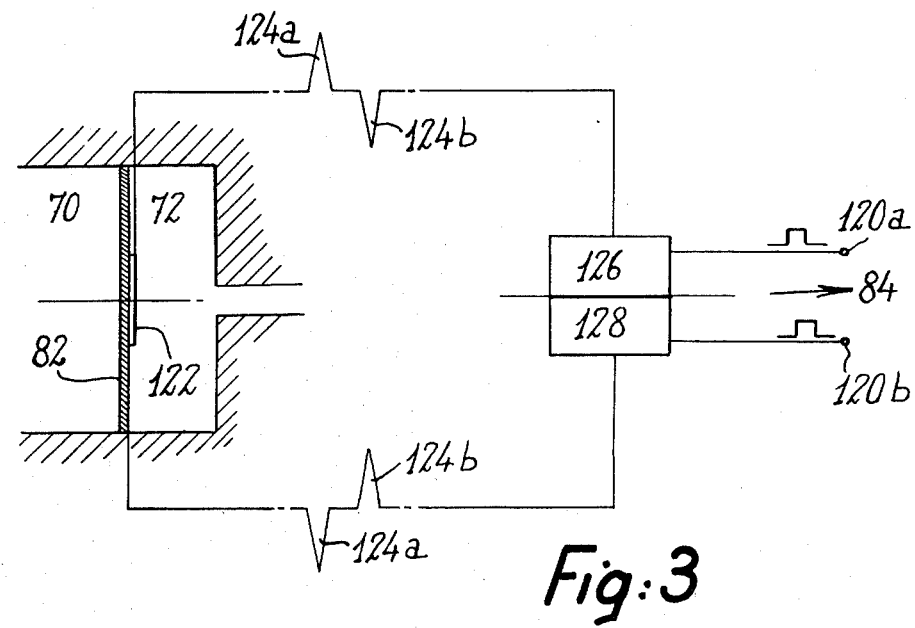
Fig:3

DIGITAL PRESSURE-MEASURING DEVICE

This application is a continuation-in-part of U.S. patent application Ser. No. 052,980 filed on June 28th 1979, now U.S. Pat. No. 4,301,685 in the name of Mr. Philippe Guillemot and relates to a digital pressure-measuring device.

The invention finds an application in the construction of pressure transducers for use in either gases or liquids but also in the design of transducers for the measurement of force, displacement, acceleration and so forth. The invention finds a preferred application in the construction of pressure transducers which can replace the pressure gages currently employed in underwater drilling sites and also in the construction of instruments for measuring the depth of immersion of an underwater diver.

The majority of known pressure-measuring instruments comprise an enclosure subjected to a fixed reference pressure and a deformable interface in contact with the fluid whose pressure is to be measured. The most simple and most characteristic example from this point of view is the diaphragm-type pressure gage with capsule and deformable wall.

These instruments are subject to a number of disadvantages and two of these will now be mentioned.

In the first place, the existence of a fixed partial pressure enclosure has the effect of subjecting the interface to increasingly high stresses when the pressure to be measured rises. The range of operation of these instruments is therefore necessarily limited at higher values. A further drawback lies in the basic design concept of these instruments which can only deliver a signal having an analog character: deflection of a pointer, amplitude of an electric signal, height of a column of liquid, and so forth. At the present time, however, signals of a digital nature are more and more frequently employed, either when it is desired to indicate the result of measurement directly in digital representation or when it is necessary to carry out a preliminary treatment by means of computing means which operate in the digital code with very rare exceptions. Instruments of the prior art must therefore be associated with analog-to-digital converters, thus clearly increasing the cost and complicating the characteristics of equipment.

The precise aim of the present invention is to provide a pressure-measuring device which overcomes these disadvantages since its range of utilization is not limited at higher values and the signal delivered by the instrument is directly available in digital representation.

This aim is achieved in accordance with the invention by making use of a chamber in which a variable reference pressure prevails (the pressure being no longer fixed as in the prior art), this pressure being intended to follow the variations in pressure to be measured by successive increments or decrements. According to the invention, the number of increments or decrements experienced by the reference pressure is then measured and this number gives the variation in pressure with respect to the initial value. As can readily be understood, it is thus possible to overcome the two disadvantages mentioned above, on the one hand by preventing any appreciable unbalance between the pressure to be measured and the reference pressure and consequently removing stresses and, on the other hand, by delivering the desired information directly in the form of a number.

In more exact terms, the present invention relates to a digital pressure-measuring device comprising a first chamber subjected to the pressure to be measured, a second chamber connected to the first through an opening fitted with a valve, a pressure-tight partition-wall between the two chambers, said wall being deformable under the action of a pressure difference between the two chambers, an element for converting the deformation of the partition-wall directly to electrical logic signals indicating the appearance of a pressure difference equal to a predetermined increment $+\Delta P$ and to a predetermined decrement $-\Delta P$ and to zero, means for initiating the opening of the valve under the action of the logic signals indicating the appearance of a pressure difference equal to $\pm \Delta P$ and for initiating closure of the valve under the action of the signal which indicates that this difference is zero; bidirectional counting means for receiving said logic signals and adapted to account for the number of increments $+\Delta P$ obtained and reduced by the number of decrements $-\Delta P$ obtained.

A number of alternative pressure-measuring devices may be contemplated, including optoelectronic, piezoelectric or electromechanical devices but other types derived from these latter may also be devised.

These and other features of the invention will be more apparent upon consideration of the following description and accompanying drawings, wherein:

FIG. 1 illustrates a pressure-measuring device in accordance with the invention, said device being equipped with an element of the optoelectronic type;

FIG. 3 illustrates a device in accordance with the invention, this device being equipped with an element of the piezoelectric type;

Figure 4:
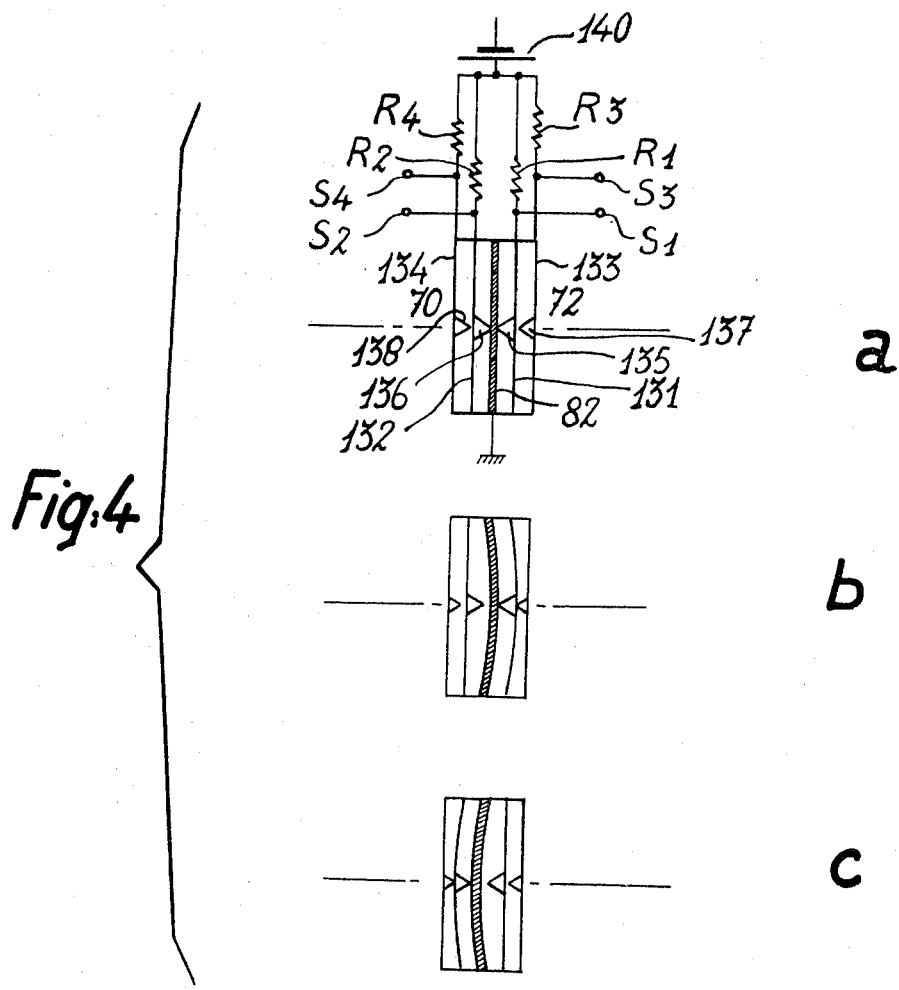
FIG. 4 illustrates a device equipped with an element of the electromechanical type.

The device shown in FIG. 1 comprises a chamber 70 subjected to the pressure to be measured, a chamber 72 subjected to the reference pressure, a passage 74 fitted with a valve 78 controlled by a means 80, and a deformable pressure-tight partition-wall 82 which is responsive to the pressure difference between the two chambers. In the example shown, the means 80 is a piezoelectric pastille. When an alternating-current voltage is applied thereto, said pastille is caused to vibrate, thus having the effect of interrupting the pressure-tightness of the passage 74. When no excitation voltage is present, the partition-wall 78 is applied against the body of the enclosure and the passage 74 is then closed with a high degree of pressure-tightness.

The means for generating logic signals which indicate the deformations of the partition-wall 82 comprise a shutter 110 which is rigidly fixed to the wall 82 and in which is pierced an aperture 112, an optical emitter 114 (such as a photodiode, for example), two light guides 116a and 116b (such as two optical fibers, for example), the inlets of said guides being located behind the shutter 110 and spaced at a distance from each other which is at least equal to the width of the aperture 112. The outlets of the two guides 116a and 116b are located opposite to two photoreceivers 118a and 118b such as phototransistors, for example, which are connected to two signals output terminals 120a and 120b. These terminals are connected to a logic circuit 84 which is capable of delivering a suitable control signal to the means 80. The device is completed by a bidirectional counter 86 which is capable of accounting for the number of increments +ΔP reduced by the number of decrements −ΔP which are observed at the time of variations in the pressure to be measured. The number obtained is indicated both in magnitude and in sign by display means 88.

The operation of this device is as follows. The emitter 114 emits continuous radiation in the direction of the photoreceivers 118a and 118b. This radiation is stopped by the shutter 110 except for the portion corresponding to the aperture 112. This portion of radiation falls between the inlets of the optical guides 116a and 116b when the partition-wall 82 is not deformed or in other words when the pressures prevailing within the two chambers 70 and 72 are the same. In this case, neither of the photoreceivers 118a and 118b receives light and the two output terminals 120a and 120b are at the same level which is considered as the zero logic level.

When a pressure difference appears between the two chambers 70 and 72, the partition-wall 82 undergoes deformation, the shutter 110 follows this deformation and the aperture 112 is displaced towards the inlet of one of the two guides (namely towards the inlet of the guide 116a if the pressure prevailing within the chamber 72 is higher than the pressure prevailing within the chamber 70 and towards the inlet of the guide 116b when this condition is reversed). One of the guides finally receives an optical radiation, which immediately results in the emission of a signal from the associated phtoreceiver and in the appearance of an electrical signal on the corresponding output terminal. The appearance of a voltage corresponds in the case of one of the terminals to +ΔP and in the case of the other terminal to −ΔP, the value of ΔP being determined by the geometry of the assembly constituted by the aperture and the two light guides in suitably spaced relation.

Each time the pressure difference attains either of the two values ±ΔP, the circuit 84 delivers a signal which is applied to the means 80 for opening the valve 78. When the difference is restored to zero, the circuit 84 delivers a signal which is capable of initiating closure of the valve.

Figure 2:
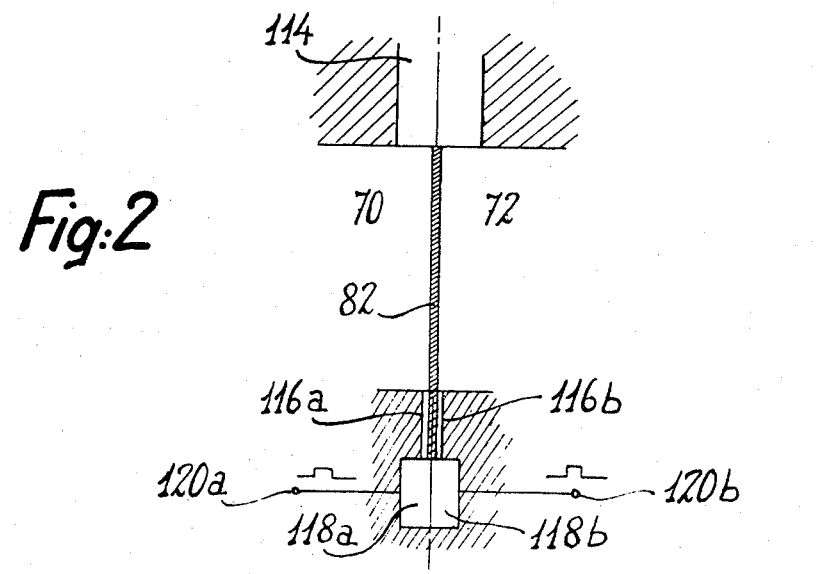
FIG. 2 illustrates a device of the same type which is equipped with another optoelectronic element.

In FIGS. 2 to 4, the circuit 84, the counter 86 and the display means 82 are no longer illustrated since they are designed and arranged in the same manner as the device of FIG. 1.

The device shown in FIG. 2 is again of the optoelectronic type. As in the preceding embodiment, this device comprises an optical emitter 114, two light guides 116a and 116b, two photoreceivers 118a and 118b connected to two output terminals 120a and 120b. The difference between this device and that of FIG. 1 lies in the fact that the function of the shutter is performed in this instance by the partition-wall 82 itself. The deformation of the wall either in one direction or in the other thus has the effect of masking the inlet of either of the two optical guides.

The device of FIG. 3 makes use of an element of the pizeoelectric type and essentially comprises a piezoelectric plate 122 which is secured to the deformable partition-wall 82. This element delivers pulses 124a or 124b of opposite polarity, depending on the direction of deformation of the plate. If necessary, logic circuits 126 and 128 can be employed for shaping the signals delivered by the plate 122 in order to produce signals which have appropriate characteristics and appear on the output terminals 120a and 120b.

Finally, the device of FIG. 4 is of the electromechanical type and comprises four deformable plates 131 to 134 which are not pressure-tight, each plate being fitted with a contact 135 to 138 respectively. Said plates are arranged symmetrically in pairs on each side of the deformable pressure-tight wall 82. The plates 131 to 134 are of electrically conductive material or incorporate a conductive element and are connected through resistors R1 to R4 to a source 140 which produces a direct-current voltage V. Said resistors are connected to output terminals S1 to S4. The partition-wall 82 is in turn formed of conductive material or incorporates a conductive element and is connected to ground.

The operation of this device is as follows. At equilibrium, the contacts 134 and 136 of the plates 131 and 132 are applied on each side of the central partition-wall 82. In this condition, the terminals S1 and S2 are connected to ground through the plates 131 and 132 and the central partition-wall and are therefore at zero potential. On the other hand, the terminals S3 and S4 are at the potential V of the source 140.

When the pressure of the chamber 70 exceeds that of the chamber 72, the central wall 82 is deformed and thrusts back the plate 131; the contact between the plate 132 and the wall 82 is interrupted; the terminals S2 and S4 are then both at the potential V.

As the central partition-wall continues to undergo deformation under the action of the increasing pressure difference, the plate 131 finally touches the contact 137. At this instant, the potential of the output S3 falls from V to 0 and the two outputs S1 and S3 are at zero potential. The combination $S2=S4=V$ and $S1=S3=0$ is interpreted as a logic state which indicates that the pressure difference has attained a value ΔP.

Conversely, when the pressure of the chamber 70 is lower than that of the chamber 72, the same process takes place but in a symmetrical manner: the potentials of the terminals S1 and S3 are both at the level V, the potential of the terminal S2 is at zero and the potential of the terminal S4 falls to zero when the difference attains the value −ΔP.

Adjustments of the value ΔP is carried out by modifying the positions of the contacts 137 and 138 with respect to the plates 131 and 132.

It is apparent from the foregoing description that the transducer in accordance with the invention offers a large number of advantages over the transducers of the prior art, viz:

- it provides intrinsically digital operation and therefore no longer calls either for a converter or for analog circuits or means;
- the stresses to which the different components of the device are subjected are equal at a maximum to the difference ΔP which is always of very low value, irrespective of the value of the pressure to be measured;
- although there does exist a lower limit of the measurable pressure range (this limit being equal to ΔP), there does not on the other hand exist any upper limit.

What is claimed is:

1. A digital pressure-measuring device comprising a first chamber subjected to the pressure to be measured, a second chamber connected to the first through an opening fitted with a valve, a pressure-tight partition-wall between the two chambers, said wall being deformable under the action of a pressure difference between the two chambers, an element for converting the deformation of the partition-wall directly to electrical logic signals indicating the appearance of a pressure difference equal to a predetermined increment +ΔP and to a predetermined decrement $-\Delta P$ and to zero, wherein said element comprises an optical emitter, two light guides in spaced relation, two photoreceivers and a screen secured to the deformable wall and capable of displacement between the emitter and the light guides in order to permit or prevent penetration of the light into either of the two guides, said device being further provided with means for initiating opening of the valve under the action of the logic signals which indicate the appearance of a pressure difference equal to $+\Delta P$ and for initiating closure of said valve under the action of the signal which indicates that said difference is zero, bidirectional counting means for receiving said logic signals and accounting for the number of increments $+\Delta P$ obtained and reduced by the number of decrements $-\Delta P$ obtained.

2. A device according to claim 1, wherein the screen which is capable of displacement between the emitter and the light guides consists of a mask provided with an aperture which is placed in the rest position opposite to the interval between the two light guides.

3. A device according to claim 1, wherein the screen which is capable of displacement between the emitter and the light guides consists of the deformable pressure-tight partition-wall itself.

4. A device according to claim 1, wherein the valve aforesaid is constituted by a wall secured to a piezoelectric pastille.

5. A digital pressure-measuring device comprising a first chamber subjected to the pressure to be measured, a second chamber connected to the first through an opening fitted with a valve, a pressure-tight partition-wall between the two chambers, said wall being deformable under the action of a pressure difference between the two chambers, an element for converting the deformation of the partition-wall directly to electrical logic signals indicating the appearance of a pressure difference equal to a predetermined increment $+\Delta P$ and to a predetermined decrement $-\Delta P$ and to zero, wherein said element comprises a piezoelectric element secured to the deformable leak-tight wall and capable of emitting electrical signals whose polarity indicates the direction of deformation of said wall, said device being further provided with means for initiating the opening of the valve under the action of the logic signals which indicate the appearance of a pressure difference equal to $+\Delta P$ and for initiating closure of the valve under the action of the signal which indicates that this difference is zero, bidirectional counting means for receiving said logic signals and adapted to account for the number of increments $+\Delta P$ obtained and reduced by the number of decrements $-\Delta P$ obtained.

6. A device according to claim 5, wherein said device further comprises two circuits for shaping the electrical signals delivered by the piezoelectric element.

7. A digital pressure-measuring device comprising a first chamber subjected to the pressure to be measured, a second chamber connected to the first through an opening fitted with a valve, a pressure-tight partition-wall between the two chambers, said wall being deformable under the action of a pressure difference between the two chambers, an element for converting the deformation of the partition-wall directly to electrical logic signals indicating the appearance of a pressure difference equal to a predetermined increment $+\Delta P$ and to a predetermined decrement $-\Delta P$ and to zero, wherein said element comprises four deformable metallic plates arranged symmetrically in pairs on each side of the deformable pressure-tight wall, each plate aforesaid being fitted with a contact and connected electrically to a voltage source through a resistor which is in turn connected to an output terminal, the deformable pressure-tight wall being also connected electrically to ground, said device being further provided with means for initiating the opening of the valve under the action of the logic signals which indicate the appearance of a pressure difference equal to $\pm\Delta P$ and for initiating closure of the valve under the action of the signal which indicates that this difference is zero, bidirectional counting means for receiving said logic signals and adapted to account for the number of increments $+\Delta P$ obtained and reduced by the number of decrements $-\Delta P$ obtained.

* * * * *